United States Patent
Marples et al.

(10) Patent No.: US 6,873,258 B2
(45) Date of Patent: Mar. 29, 2005

(54) LOCATION AWARE SERVICES INFRASTRUCTURE

(75) Inventors: David Marples, Mansfield Notts (GB); Christopher Brightman, Leicestershire (GB); David Famolari, Montclair, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 139 days.

(21) Appl. No.: 10/119,566

(22) Filed: Apr. 10, 2002

(65) Prior Publication Data

US 2002/0167919 A1 Nov. 14, 2002

Related U.S. Application Data

(60) Provisional application No. 60/282,833, filed on Apr. 10, 2001.

(51) Int. Cl.$^7$ .............................................. G08B 13/14
(52) U.S. Cl. ................ 340/572.1; 340/5.2; 340/539.13; 340/539.22; 340/573.1; 340/825.36; 340/825.99; 455/456.1
(58) Field of Search .......................... 340/572.1, 572.3, 340/572.2, 573.1, 573.4, 825.69, 825.72, 825.36, 539.1, 539.13, 539.22, 825.49, 5.2, 539.11, 902, 903, 904, 905; 455/411, 456, 456.1, 456.5, 456.6, 404.2; 379/38; 370/338, 339

(56) References Cited

U.S. PATENT DOCUMENTS

| | | | | |
|---|---|---|---|---|
| 5,153,584 A | * | 10/1992 | Engira | 340/825.36 |
| 5,317,309 A | * | 5/1994 | Vercellotti et al. | 340/825.54 |
| 5,917,425 A | * | 6/1999 | Crimmins et al. | 340/825.49 |
| 5,977,913 A | * | 11/1999 | Christ | 342/465 |
| 6,344,794 B1 | * | 2/2002 | Ulrich et al. | 340/539 |
| 6,393,271 B1 | * | 5/2002 | Dougherty | 455/411 |
| 6,509,829 B1 | * | 1/2003 | Tuttle | 340/10.1 |
| 6,570,487 B1 | * | 5/2003 | Steeves | 340/5.2 |

* cited by examiner

*Primary Examiner*—Davetta W. Goins
(74) *Attorney, Agent, or Firm*—Glen Farbanish; Joseph Giordano

(57) ABSTRACT

Entity identity information and location identity information are sensed and made available to subscriber applications through a secure location-aware services infrastructure, thereby allowing for the creation of location-based services. Information detected by a sensor is passed to an interface aggregator for conversion to a standardized format and then forwarded to location registers for the domain of the sensors. Subscriber applications query the registers to determine which entities are in a particular location and to determine the location of entities. By unifying diverse sensing technologies, location information can be simultaneously obtained on varying degrees of granularity. In addition, the system is scalable to large scenarios by using a plurality of sensors, interface aggregators, and registers.

5 Claims, 2 Drawing Sheets

LOCATION AWARE SERVICES INFRASTRUCTURE

RELATED APPLICATION

The present application claims the benefit of U.S. Provisional Application No. 60/282,833 filed on Apr. 10, 2001 entitled, "Method and System for Delivery of Mobile Location Information."

BACKGROUND OF OUR INVENTION

1. Field of the Invention

Our invention relates generally to tracking user proximity in order to support location-based services. More particularly, our invention relates to methods and apparatus for dynamically determining user proximity identification information from diverse sources and making this information available on a standardized basis to location sensitive services.

2. Description of the Background

There is a continued emergence of networked based appliance technologies/devices that have been integrated into wide area networks. In general, these are single or limited function consumer devices with an embedded processor and a network connection, the combination of which allow these devices to be controlled via network based applications. There is also a continued emergence of personal digital assistants (PDAs) and wireless technologies that allow these devices to be constantly networked. From a different perspective, there is also an existence of numerous technologies that can track and/or detect the physical location of a user or entity; such technologies include cellular systems, credit card scanners, badging systems, etc. Significant benefits could be achieved by combining network appliances, PDA's, and location detection capabilities to create location-sensitive services, which services could provide automated interaction and inter-working with networked appliances and PDA's based on the detection/knowledge of a user or entity's proximity. Example applications could include automatically opening doors and turning on lights as a user approaches a room, displaying room-reservation information on a PDA as a customer enters a hotel, or even displaying user specific messages on public signs as a user walks by. In general, such services are a combination of detecting a user or entity location and allowing some application to retrieve this location and then interact with networked devices.

However, what is missing in order to provide such location-sensitive services are methods and systems for providing location sensitive information. Cellular telephony and credit card systems, as examples, are widely deployed and can track user proximity on a large-scale basis. However, relative to networked appliance-based applications, the proximity information these systems possess is only a side effect of the main service and is thereby not ubiquitously available to external applications. Companies, such as ActiveRF Ltd, provide systems that detect/track a user or entity's proximity and make this information available for use by other applications. However, these systems are directed at small-scale applications thereby making it difficult to track users on a large-scale ubiquitous nature.

SUMMARY OF OUR INVENTION

It is desirable to have methods and apparatus that overcome the disadvantages of prior-systems and unify divergent location detection technologies to appear as a single system that provides proximity and identity information through a standardized interface to subscriber applications, which can then use the information to provide advanced user services. Such large-scale proximity information would allow for the creation of new service scenarios.

In accordance with our invention, any technology/system able to detect and track the identity and location of a user/entity is considered a sensor. By utilizing such a diverse set of sensing technologies, our invention provides large-scale high-resolution coverage of an entity's proximity and, additionally, allows a user's proximity to be defined from multiple perspectives (e.g., a user is located at a specific counter, in a specific store, of a specific mall). An interface aggregator is associated with one or more sensors and gathers the entity identity and location information as it changes and converts this information to a standardized format. Each interface aggregator also associates the location of the detected entity with a domain (i.e., a geographical region) and uses this domain to locate an entity identity register and a location identity register, which maintain the location and identity information of the entities for that domain. Once locating the registers, the interface aggregator forwards the standardized information to the registers. For security and privacy purposes, an entity can use an access control list to specify which sensors have authorization to track its location.

It is an aspect of our invention that the entity identity register, given a specific entity, is able to provide the location in which the entity is located. It is a further aspect of our invention that the location identity register, given a specific location, is able to provide the entities within that location. Both registers can make this information available to subscriber applications. Specifically, subscriber applications can query a register(s) for information or request a register(s) to notify it when entity and location information changes. Once obtaining location and identity relevant information, the subscriber applications can interact with other systems, such as network appliances and PDAs, to provide enhanced services. Subscriber application interaction with the registers is through standardized interfaces. Similar to above, an entity can use an access control list to specify which subscriber applications can access a register to determine its location.

It is an aspect of our invention that the system is independent of the actual sensing technologies, that multiple sensing technologies can be simultaneously used, and that these multiple technologies can simultaneously track the same entity. As such, subscriber applications can query the registers specifying varying degrees of location-granularity and can obtain multiple locations for an entity, each at varying degrees. Systems in accordance with our invention can be utilized both for small-scale situations, where the monitored entities may even all be co-located, and for large-scale distributed operations, requiring a plurality of sensors, interface aggregators, and registers. Further, if desired, systems in accordance with our invention can employ redundancy schemes and can be made both private and secure, by utilizing authentication schemes, encryption, or other techniques known in the art.

DETAILED DESCRIPTION OF OUR INVENTION

Figure 1:
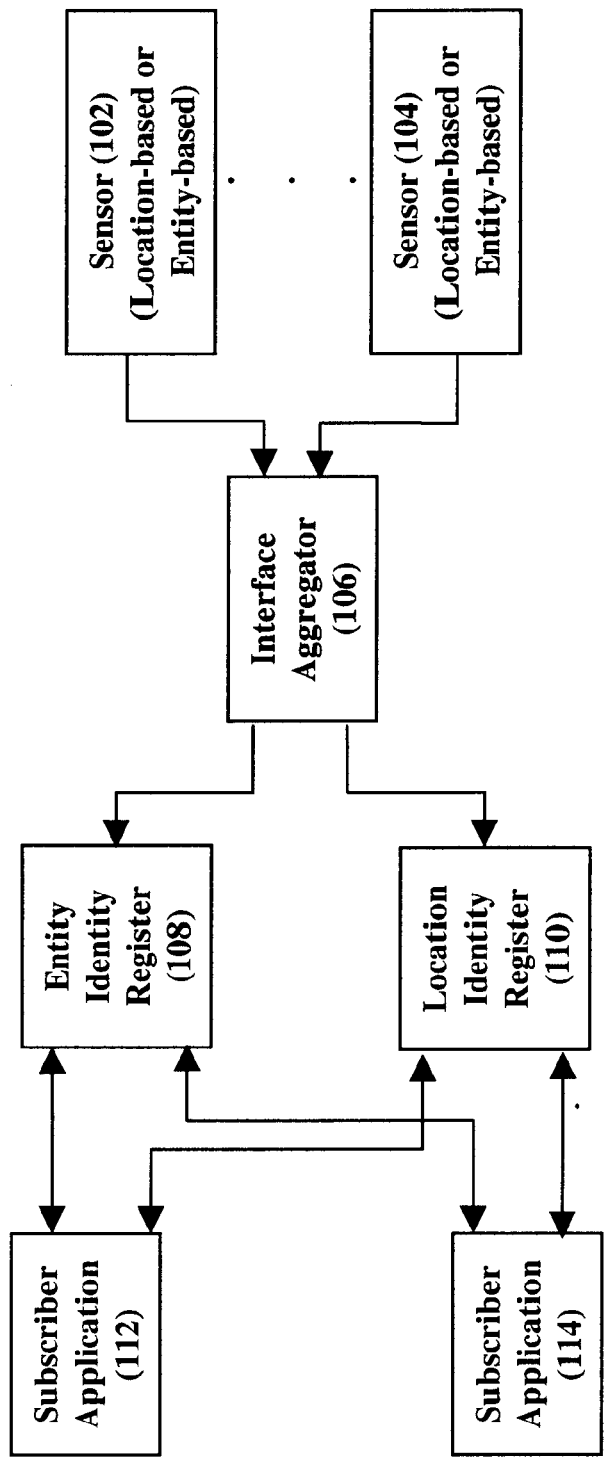
FIG. 1 depicts an illustrative embodiment of a secure location-aware services infrastructure of our invention that tracks location and identity relevant information and makes this information available to subscriber applications to provide location-based services.

FIG. 1 shows a block diagram of a secure location-aware services infrastructure 100 of our invention that tracks geographical and identity sensitive information and makes this information accessible in a standardized format to authorized applications to provide location-based services. Specifically, on its simplest scale, system 100 comprises a set of sensors 102–104 based on a particular technology, an interface aggregator 106 corresponding to the sensors 102–104, an entity identity register 108, a location identity register 110, and subscriber applications 112–114. As system 100 is scaled to cover larger areas, it may comprise additional sensors based on a plurality of technologies, additional aggregators corresponding to these sensors and technologies, and additional entity identity and location identity registers. This is further explained below.

A sensor 102 or 104 is any device and/or system that is capable of determining the location and identity of an entity (e.g., a person or physical object). The granularity of the entity's location capable of being determined by a sensor depends on the specific sensor technology. Unique to our inventive system, a sensor may be a specific technology/system whose purpose is to track location; however, our inventive location-aware service infrastructure also allows a sensor to be a technology/system where location detection is a side affect of the system's primary function. For example, credit card systems, when a user swipes a card, detect that user's location as a side affect of the system's primary function. A credit card system is a sensor in accordance with our invention.

Sensors essentially come in two forms: location-based sensors and entity-based sensors. An entity-based sensor is a sensor that knows the identity of an entity and senses location. An example of such a sensor is the short-range wireless micro-location system provided by ActiveRF Ltd, and is further described below. A location-based sensor is a sensor at a fixed known location that detects the presence of an entity. An example of such a sensor is the credit card scanner example from above. Upon a card being scanned, the scanner determines the identity of the user and conveys this information along with the store identity to the credit card company's server. Hence, the server has both the location and identity of a user and together with the scanner, acts as a sensor. Other examples of location based sensors are security card-scanners, face recognition scanners, and mobile phone systems (e.g., location could be based on a cell location), each of which would operate similarly to the credit card scanner.

It is also important to note that the deployment of sensors and therefore the scale of system 100 can vary. System 100 can correspond to a home or building, in which case the sensors are confined to these areas. On the contrary, system 100 may correspond to a mall or town, etc., in which case sensors are more widely deployed. With that said, its should be further noted that system 100 may comprise a single sensor technology or a plurality of sensor technologies simultaneously deployed. The varying sensor technologies may correspond to separate geographical regions. However, they may also correspond to the same geographical region, providing overlapping coverage. Advantageously, this unique aspect of our invention allows an entity's location to be simultaneously tracked on different scales; for example, the system can track an entity indicating that the entity is in a town, in a mall within the town, within a store within the mall, and perhaps even a location within the store. For example, an individual engaged in a cell phone call while using a credit card could be tracked by two sensors, thereby providing two different degrees of location granularity.

An interface aggregator 106 is associated with one or more sensors 102–104 and may be specific to a particular sensing technology. Upon sensing an entity's presence, a sensor conveys both the identity and location of that entity to the sensor's corresponding interface aggregator. An interface aggregator performs two specific functions. First, because each sensing technology will maintain location and identity information in a format specific to that technology, the interface aggregator converts the information to a standardized format. This standardization is what allows system 100 to comprise a plurality of different sensing technologies and sensors. The second function is related to the concept that the sensors of system 100 can be viewed as existing within different domains, or in other word, different logical or physical regions. The size and number of domains monitored by system 100 depends, for example, on the scale in which system 100 is deployed and the number and types of applications that will be using the system. For example, a home could be viewed as a single domain, a building could be viewed as several domains, etc. As such, the interface aggregator also determines the domain of a sensed entity.

Once the interface aggregator 106 standardizes the detected information, it forwards the information to the entity identity and location entity registers 108–110 for storage. Because system 100 may cover multiple domains, multiple registers may be used to store the information, each register storing information for one or more domains. As such, the importance of the interface aggregator determining the domain of a detected entity is to determine which register should store the information.

As mentioned, entity identity register 108 and location identity register 110 maintain/store the location(s) and identity information for the sensed entities, but each stores the information in a different format. The differing formats allow the location identity register to specify the entities within a particular location and allow the entity identity register to specify the location(s) of an entity. Hence, the format of each register allows queries of the form, "who is at location x?" and "where is user y?" (Note in general that the dual register functionality could also be provided by a single register). As described above, as system 100 grows, it may be broken into multiple domains and each domain may be assigned a location identity register and an entity identity register. Hence, system 100 may comprise a plurality of register pairs, each pair maintaining information for one or more domains (Note that multiple registers could also be used to serve the same domain for redundancy purposes). Hence, a location identity register for a specific domain is able to provide which entities are at specific locations within that domain (and again, the locations maintained by the register may be at different scales.) An entity identity register for a particular domain is able to provide the specific location(s) of entities within that domain (the register may provide multiple locations if the entity is sensed by multiple sensors at different scales).

The services provided by the registers can be subscribed to by subscriber applications 112–114. In general, subscriber applications can make two types of requests to these registers. First, an application can query a location register for the entities within a specific location (similarly, it can query an entity register for the location of a specific entity). Second, an application can request to be notified based on changes in locations and entities. In other words, an application can request a location identity register to notify it each time the entities within a given location change (and similarly, can request a entity identity register for a notification each time an entity's location changes.) Note that a subscriber application may subscribe to many registers at one time. Also note that in order to ensure the location information maintained by the registers is timely and accurate, time and date information can be associated with the entries and purged by the registers after a period of time has expired.

Figure 2:
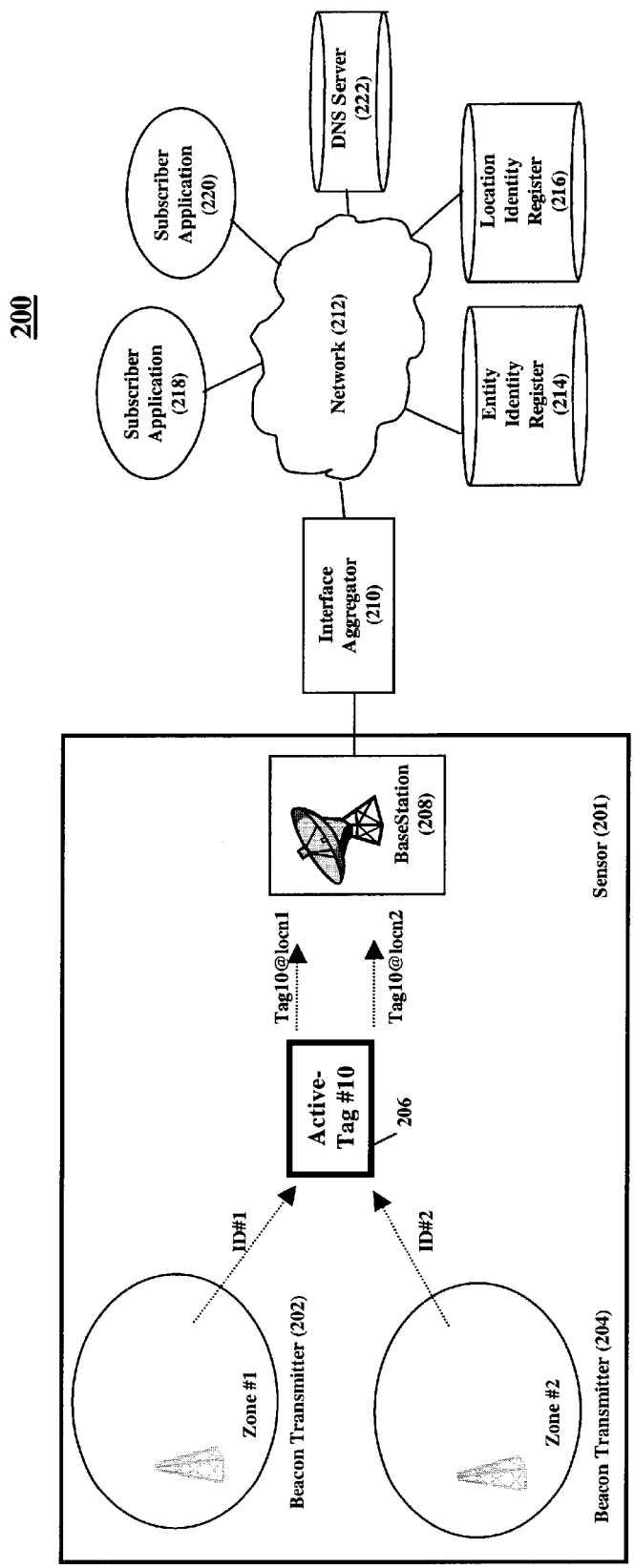
FIG. 2 depicts a specific embodiment of our invention where entity location and identity information are tracked through a small-scale wireless system, which location and identity information are made available to subscriber applications in a standardized format through a data network.

Reference will now be made to a specific embodiment of our invention as shown in FIG. 2. Beginning with the sensing technology, an entity-based sensor 201 is shown, specifically, the short-range wireless micro-location system provided by ActiveRF Ltd. This sensing technology comprises three components: beacon transmitters 202–204, active tags, such as active tag 206, and a base station 208. Beacon transmitters are fixed location devices each with a known identifier, which identifiers correspond to the fixed locations of the transmitters. At regular intervals, each beacon transmitter transmits its identifier using a low frequency radio signal.

Active tags are typically carried by a user (or attached to an object being moved) and each tag has a unique identifier, associated with that user. The tags monitor for beacon identifiers broadcast by the beacon transmitters 202–204. When an identifier is detected by a tag as the tag passes through the region covered by the corresponding transmitter, the tag transmits both its known identity and the identity of the detected region to the base station 208 using a higher radio frequency.

The base station monitors the transmissions from the active tags. When a message is received from a tag, the base station conveys the information to an interface aggregator 210 (note that the interface aggregator 210 is unique to our invention and separate from the ActiveRF technology) that translates the tag identifier and beacon transmitter identifier to a standardized entity identifier and location. The interface aggregator 210 may be co-located with the base station 208 and interconnected through an RS-232 connection, for example. However, the sensor and interface aggregator may also be interconnected through a data network, allowing the aggregator to service multiple sensors.

After standardizing the format of the identity and location information, the interface aggregator next associates the location of the entity with a domain and uses this domain to locate the appropriate entity identity register 214 and location identity register 216 that maintain the information for this domain. Specifically, in this embodiment the aggregator and identity registers are interconnected through a data network 212. Hence, the domain served by the registers can also be used as a domain name for the registers. As such, using DNS (domain name server) server 222 (containing for example, appropriately configured DNS A-records or DNS SRV records), the aggregator can determine the network addresses of the registers 214–216 and, using these addresses, forward the location/identity information to the registers.

As indicated, the entity identity and location identity registers also reside on network 212 and maintain location information for one or more domains. In general, the configuration of a register with respect to the domains it manages must match the configuration of the DNS server 222 regarding the translation of domain names to the appropriate register. Each register on the network maintains a well-known TCP (transmission control protocol) port, as an example, through which the aggregators can establish communications and send the location-based information. As part of this procedure, a register may determine if the entity being reported has authorized a specific sensor and therefore aggregator to report its location. This authorization can be performed through access control lists maintained by the register and set by the entity. If an aggregator is not authorized to report a location, the register will not store the location.

Each register also maintains, for example, a second well-known TCP port through which subscriber applications 218–220, which are also located on network 212, can make requests to the registers. Subscriber applications again use the domain concept to determine a general location on which information is desired and similar to the aggregators, use the domain to locate and communicate with the register(s) that control that domain. Similar to the above, a register may determine if an entity, whose information is being requested by a subscriber application, has authorized the service subscriber application to receive the information. Again, this authorization can be performed through access control lists maintained by the register and set by the entity.

Subscriber applications with appropriate access can obtain information from the registers either by querying a register for current information or by registering (or unregistering) with a register requesting to be notified when entities within a location change or the location of an entity changes. Whether a query or notification request, the subscriber applications provide the register with an identifier of the entity or location to be monitored. In the case of an update, the subscriber application also provides a TCP port, for example, through which updates can be sent.

Note that TCP advantageously provides reliable communications; however, rather than using TCP, SIP (session initiation protocol) could also be used for establishing communications. Advantageously, SIP is also reliable and offers authentication and encryption. It should also be noted that for scalability purposes, one set of location identity and entity identity registers can be assigned per domain. However, one set could also service multiple domains and multiple sets could service the same domain. The latter example (i.e., multiple sets could service the same domain) provides redundancy in the event of a system failure and also helps to alleviate the problem of data hotspots if too many subscriber applications are trying to determine information on a particular domain. In this case, aggregators would need to update all registers, or the registers themselves could maintain the redundancy. As for access by the subscriber applications, techniques similar to those used in email could be used to manage the requests among the redundant registers.

An example application of the above embodiment is a system 200 deployed within a building where employees wear badges containing the active tag functionality. The system may monitor a set of secure doors, and, as employees approach these doors, the system updates a location identity register with the employee identity and location. In turn, a subscriber application could register with the location identity register for each specific door and request automatic updates each time an employee approaches a door. Based on an update, the application could cross-reference a security database to determine if the employee is authorized to enter the door and, if so, communicate with the door via a network connection to automatically unlock the door.

The above-described embodiments of our invention are intended to be illustrative only. Numerous other embodiments may be devised by those skilled in the art without departing from the spirit and scope of our invention.

We claim:

1. A system for automatically advising a subscriber application of changes with respect to the identity of at least one or more entities or a location in which an entity is located, each entity having a unique tag identifier, said system comprising a plurality of beacon transmitters, each transmitting an identifier of the region of the beacon transmitter, said entity tags monitoring for beacon identifiers broadcast by the beacon transmitters, a base station for receiving from an entity both its identity and the identity of the broadcast beacon identifier, an entity identity register which specifies the locations of entities, and a location identity register which specifies the entities within a particular location, each of said registers containing criteria predetermined by a subscriber application as to the change of conditions with respect to an entity or a location which is to be brought to the attention of the subscriber application, said registers notifying the subscriber application when changes of an entity or location meet said criteria.

2. The system in accordance with claim 1 further comprising a network interconnecting said registers and said subscriber application and an interface aggregator connected to said network, said interface aggregator translating said identifiers of the region of a beacon transmitter and of an entity tag in that region to standardized entity tag and location identifiers for transmission to a register.

3. The system in accordance with claim 2 further comprising a server connected to said network with which said aggregator can communicate to determine the network address of the subscriber application whose predetermined criteria has been met by the change in condition with respect to an entity or a location.

4. The method in accordance with claim 1 further comprising the step of translating said identifiers of a beacon and of an entity from the base station into standard format for transmission to a register.

5. A method for automatically advising a subscriber application of changes with respect to the identity of an entity or a location in which an entity is located, each entity having a unique tag identifier, said method comprising the steps of:

periodically transmitting from a beacon an identifier of the region of the beacon, receiving at a base station from an entity in response to a periodic transmission both the identity of the entity and the identification of the transmitting beacon;

receiving from the base station at an entity identity register and a location identity register the identity of the entity and the identification of the transmitting beacon, said registers containing criteria predetermined by the subscriber application as to the changes of conditions with respect to an entity or a location which are to be brought to the attention of the subscriber application, and providing to the subscriber application information as to a change in condition of either an entity or a location if such change of the entity or location meets said criteria.

* * * * *